(12) United States Patent
Lee

(10) Patent No.: US 11,694,483 B2
(45) Date of Patent: Jul. 4, 2023

(54) APPARATUS FOR ALARMING OF OIL DILUTION AND METHOD THEREOF

(71) Applicants: HYUNDAI MOTOR COMPANY, Seoul (KR); Kia Corporation, Seoul (KR)

(72) Inventor: Minyong Lee, Incheon (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 68 days.

(21) Appl. No.: 17/476,988

(22) Filed: Sep. 16, 2021

(65) Prior Publication Data

US 2022/0375272 A1 Nov. 24, 2022

(30) Foreign Application Priority Data

May 3, 2021 (KR) .................. 10-2021-0056993

(51) Int. Cl.
*G07C 5/00* (2006.01)
*G07C 5/02* (2006.01)

(52) U.S. Cl.
CPC .............. *G07C 5/006* (2013.01); *G07C 5/02* (2013.01)

(58) Field of Classification Search
CPC .................. G07C 5/006; G07C 5/02
See application file for complete search history.

(56) References Cited

U.S. PATENT DOCUMENTS

2014/0058647 A1* 2/2014 Haladyna .............. B60W 10/06 701/104
2016/0194999 A1* 7/2016 Hakeem .................... F01P 7/10 123/41.04

FOREIGN PATENT DOCUMENTS

KR 10-2019-0053597 A 5/2019
KR 10-2020-0060898 A 6/2020

* cited by examiner

*Primary Examiner* — Benyam Haile
(74) *Attorney, Agent, or Firm* — Morgan, Lewis & Bockius LLP

(57) ABSTRACT

An apparatus for alarming of oil dilution may include: a control device for predicting oil dilution based on a cold start state of a vehicle, a rapid acceleration state of a vehicle, and a high-speed maintenance time of a vehicle; and an alarming device that guides the driver to check or replace engine oil based on the oil dilution predicted by the control device.

19 Claims, 3 Drawing Sheets

APPARATUS FOR ALARMING OF OIL DILUTION AND METHOD THEREOF

CROSS-REFERENCE TO RELATED APPLICATION

This application claims the benefit of priority to Korean Patent Application No. 10-2021-0056993 filed on May 3, 2021 in the Korean Intellectual Property Office, the entire contents of which are incorporated herein by reference.

TECHNICAL FIELD

The present disclosure relates to an apparatus for alarming of oil dilution and a method thereof. More particularly, the present disclosure relates to an apparatus for alarming of oil dilution and a method thereof that may predict oil dilution and provide it to a driver.

BACKGROUND

Oil dilution refers to a phenomenon in which a fuel is diluted in engine oil of a vehicle and lubrication performance of the oil decreases.

When the oil dilution occurs excessively, a viscosity of the engine oil decreases, thereby increasing risks of damage to parts constituting the engine, such as bearings, connecting rods, and crankshafts.

Therefore, there is an increasing need to predict the oil dilution and provide the driver with an opportunity to check or replace the engine oil.

The above information disclosed in this Background section is only for enhancement of understanding of the background of the disclosure, and therefore it may contain information that does not form the prior art that is already known in this country to a person of ordinary skill in the art.

SUMMARY

The present disclosure aims to provide an apparatus for alarming of oil dilution and a method thereof that may predict oil dilution to be provided to a driver in advance to solve the problem as described above.

An apparatus for alarming of oil dilution according to an embodiment of the present disclosure may include: a control device for predicting oil dilution based on a cold start state of a vehicle, a rapid acceleration state of a vehicle, and a high-speed maintenance time of a vehicle; and an alarming device that guides the driver to check or replace engine oil based on the oil dilution predicted by the control device.

The control device may determine a first parameter based on the cold start state of the vehicle, determine a second parameter based on the rapid acceleration state of the vehicle, determine a third parameter based on the high-speed maintenance time of the vehicle, and predict the oil dilution based on the first to third parameters.

The control device may set the first parameter as a reference value when the vehicle is not in a cold start state, and set the first parameter to be larger than the reference value when the vehicle is in a cold start state.

When the coolant temperature is higher than the standard temperature, the control device may determine that the vehicle is not in a cold start state and sets the first parameter to the reference value, and when the coolant temperature is less than the standard temperature, the control device may determine that the vehicle is in a cold start state and sets the first parameter to be larger than the reference value.

When the coolant temperature is between the standard temperature and the threshold temperature, the control device may increase the first parameter by a first interval, and when the coolant temperature is lower than the threshold temperature, the control device may increase the first parameter in a second interval that is greater than the first interval.

When the acceleration time for the coolant temperature to reach the standard temperature is the reference acceleration time, the control device may set the second parameter as the reference value, when the acceleration time is less than the reference acceleration time, the control device may increase the second parameter by the first interval based on the reference value, and when the acceleration time is greater than the reference acceleration time, the control device may decrease the second parameter by a second interval that is greater than the first interval based on the reference value.

When a high-speed maintenance time at which the coolant temperature maintains a predetermined temperature for a predetermined time is a reference high-speed maintenance time, the control device may set the third parameter as a reference value, when the high-speed maintenance time is greater than the reference high-speed maintenance time, the control device may decrease the third parameter with the first interval, and when the high-speed maintenance time is less than the high-speed maintenance time, the control device may increase the third parameter with a second interval that is greater than the first interval.

The control device may predict the oil dilution based on the average of the sum parameter calculated as the sum of the first and third parameters for a predetermined starting number.

The control device may guide the check or replacement of the engine oil to the driver through an alarming device when the average of the summing parameter is greater than or equal to the reference average.

A method for alarming of oil dilution according to another embodiment of the present disclosure includes: determining a cold start state of a vehicle; determining a rapid acceleration state of the vehicle by a control device; determining a high-speed maintenance time of the vehicle by the control device; predicting oil dilution based on the cold start state of the vehicle, the rapid acceleration state of the vehicle, and the high-speed maintenance time of the vehicle by the control device; and guiding checking and replacement of the engine oil to the driver based on the oil dilution by the alarming device.

A first parameter may be determined based on the cold start state of the vehicle, a second parameter may be determined based on the rapid acceleration state of the vehicle, a third parameter may be determined based on the high-speed maintenance time of the vehicle, and the oil dilution may be predicted based on the first parameter to the third parameter.

When the vehicle is not in a cold start state, the first parameter may be set as a reference value, and when the vehicle is in a cold start state, the first parameter may be set larger than the reference value.

When the coolant temperature is higher than the standard temperature, it may be determined that the vehicle is not in a cold start state, and the first parameter may be set as the reference value, and when the coolant temperature is less than the standard temperature, it may be determined that the vehicle is in a cold start state, and the first parameter may increase from the reference value.

When the acceleration time at which the coolant temperature reaches the standard temperature is the reference acceleration time, the second parameter may be set as the reference value, when the acceleration time is less than the reference acceleration time, the second parameter may be increased by the first interval based on the reference value, and when the acceleration time is greater than the reference acceleration time, the second parameter may decrease in a second interval that is larger than the first interval based on the reference value.

When the coolant temperature is between the standard temperature and the threshold temperature, the first parameter may be increased by the first interval, and when the coolant temperature is lower than the threshold temperature, the first parameter may be increased in a second interval that is greater than the first interval.

When the acceleration time at which the coolant temperature reaches the standard temperature is the reference acceleration time, the second parameter may be set as the reference value, when the acceleration time is less than the reference acceleration time, the second parameter may be increased by the first interval based on the reference value, and when the acceleration time is greater than the reference acceleration time, the second parameter is decreased in a second interval that is larger than the first interval based on the reference value.

When a high-speed maintenance time at which the coolant temperature is maintained for a predetermined time is a reference high-speed maintenance time, the third parameter may be set as a reference value, when the high-speed maintenance time is greater than the reference high-speed maintenance time, the third parameter may be decreased by the first interval, and when the high-speed maintenance time is less than the reference high-speed maintenance time, the third parameter may be increased by a second interval that is greater than the first interval.

The oil dilution may be predicted based on the average of a sum parameter calculated as the summing of the first parameter to the third parameter during a predetermined starting number.

When the average of the sum parameter is greater than or equal to the reference average, the alarming device may guide the driver to check or replace the engine oil.

According to the apparatus for alarming of oil dilution and the method thereof according to an embodiment of the present disclosure as described above, based on the cold start state of the vehicle, the rapid acceleration state of the vehicle, and the high-speed maintenance time of the vehicle, the oil dilution may be predicted and an opportunity for the driver to check or replace the engine oil may be provided to the driver.

Through this, it is possible to prevent damage to parts constituting the engine in advance.

BRIEF DESCRIPTION OF THE DRAWINGS

The drawings are provided for reference to explain an illustrative embodiment of the present disclosure, and the technical spirit of the present disclosure should not be interpreted to be limited to the accompanying drawings.

DETAILED DESCRIPTION OF THE EMBODIMENTS

Figure 1:
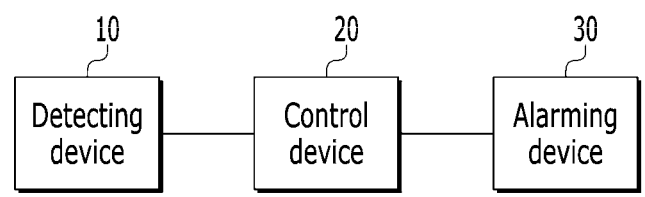
FIG. 1 is a block diagram of a configuration of an apparatus for alarming of oil dilution according to an embodiment of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

Further, in the drawings, a size and thickness of each element are arbitrarily represented for better understanding and ease of description, and the present disclosure is not limited thereto.

Hereinafter, an apparatus for alarming of oil dilution according to an embodiment of the present disclosure is described with reference accompanying drawings.

FIG. 1 is a block diagram of a configuration of an apparatus for alarming of oil dilution according to an embodiment of the present disclosure.

As shown in FIG. 1, the apparatus that is alarming of oil dilution according to an embodiment of the present disclosure may include a detecting device 10, a control device 20, and an alarming device 30.

The detecting device 10 may include a coolant temperature sensor for detecting a coolant temperature of the vehicle, an oil temperature sensor for detecting a temperature of engine oil of the vehicle, an outside temperature sensor for detecting an outside air temperature, and an accelerator pedal position sensor for detecting an opening degree of the accelerator pedal. The cooling temperature, the engine oil temperature, the outside air temperature, and the opening degree of the accelerator pedal detected by the detecting device 10 are transmitted to the control device 20.

The control device 20 may predict the oil dilution based on the coolant temperature, the engine oil temperature, the outside air temperature, or the accelerator pedal opening degree transmitted from the detecting device 10. The control device 20 may convert the oil dilution predicted based on the coolant temperature or the engine oil temperature into a quantified value and transmit it to the alarming device 30.

To this end, the control device 20 may include at least one processor operated by a predetermined program, and the predetermined program is adapted to perform each step of the alarming method of the oil dilution according to an embodiment of the present disclosure.

The alarming device 30 may guide the driver to check and/or change the engine oil based on the oil dilution converted to the quantified value predicted by the control device 20. The alarming device 30 may be implemented through a cluster or a center fascia installed in the vehicle.

Hereinafter, an alarming method of the oil dilution according to an embodiment of the present disclosure as described above is described in detail with reference to the accompanying drawings.

Figure 2:
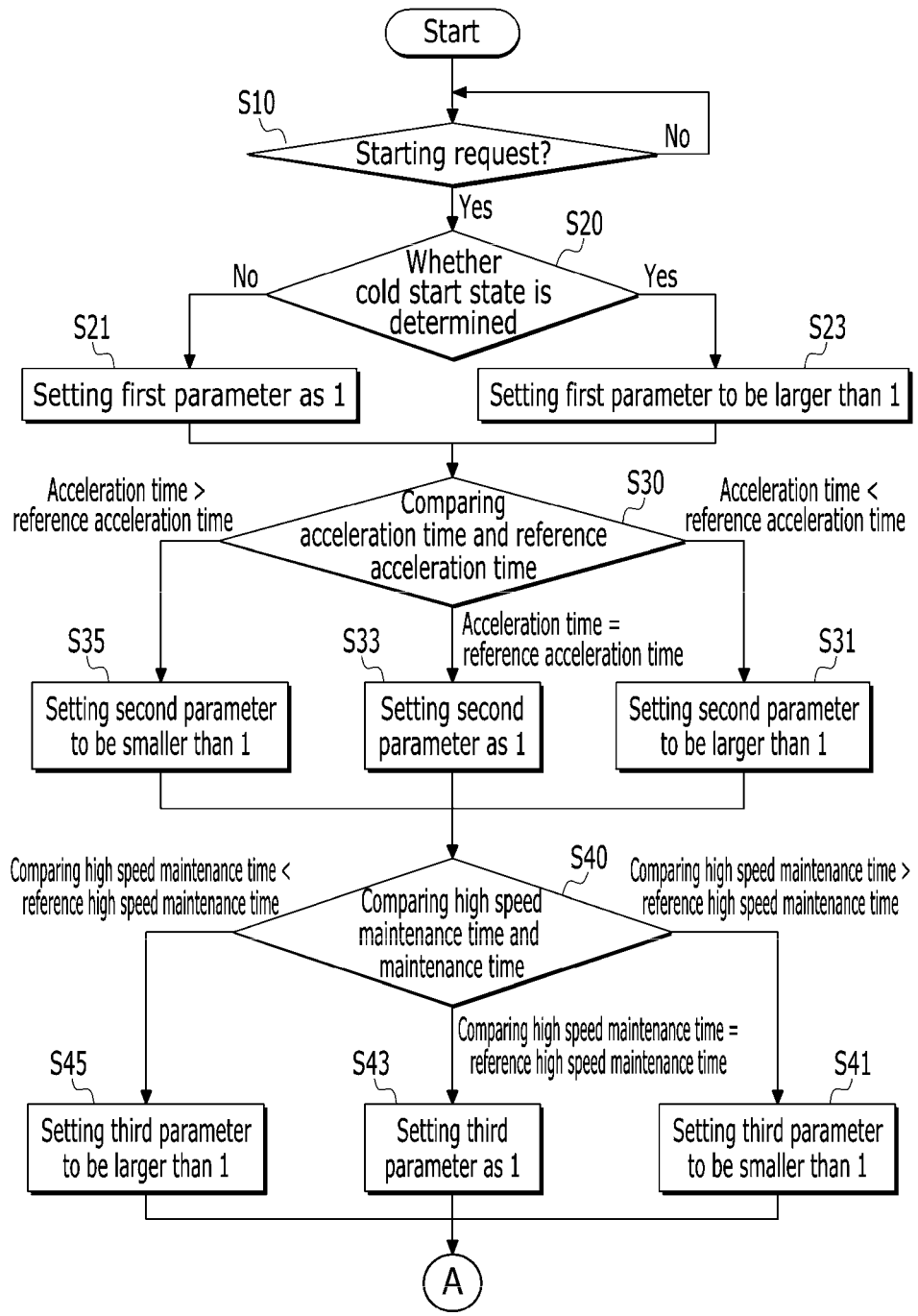
FIG. 2 and FIG. 3 are flowcharts showing a method of alarming of oil dilution according to an embodiment of the present disclosure.
Figure 3:
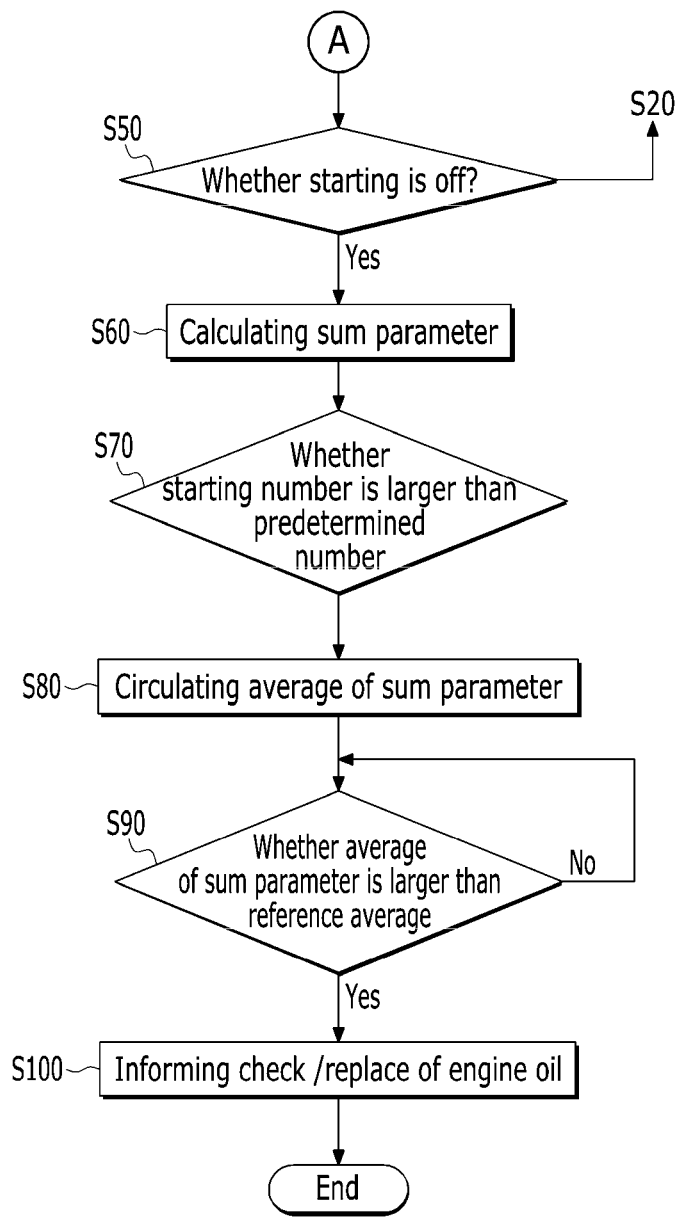

FIG. 2 and FIG. 3 are flowcharts showing a method of alarming of oil dilution according to an embodiment of the present disclosure.

As shown in FIG. 2 and FIG. 3, a control device 20 detects a starting request of the vehicle (S10). When the driver moves the starting key to the starting position or presses the starting button, it can be determined that the driver's starting request is input.

When the starting request of the vehicle by the driver is input, the coolant temperature sensor of the detecting device 10 detects the coolant temperature, and the coolant temperature detected by the coolant temperature sensor is transmitted to the control device 20.

The control device 20 determines whether the vehicle is cold-started from the coolant temperature (S20). For example, if the coolant temperature detected when the vehicle starts is less than a predetermined standard temperature (e.g., 30 degrees Celsius), the control device 20 may be determined to be in a cold start state, and otherwise, the control device 20 may be determined to not be in a cold start state.

If the vehicle is not in the cold start state, the control device 20 sets a first parameter as a reference value S21.

If the vehicle is in the cold start state, the control device 20 sets the first parameter as a value of greater than the reference value (e.g., '1') (S23). At this time, the first parameter gradually increases as the coolant temperature decreases. When the coolant temperature is lower than a predetermined threshold temperature (e.g., minus 20 degrees Celsius), the first parameter increases steeply.

In other words, if the coolant temperature at the starting is above the standard temperature, the first parameter may be set as a reference value. If the coolant temperature is between the standard temperature and the threshold temperature at the starting, the first parameter may be increased by the first interval. And if the coolant temperature at the starting is lower than the threshold temperature, the first parameter may be increased to the second interval that is larger than the first interval.

For example, as shown in Table 1 below, when the coolant temperature is 30 degrees Celsius (the standard temperature) or higher at the starting, the first parameter may be set to 1 (a reference value). At the starting, if the coolant temperature is between 30 degrees Celsius and −20 degrees Celsius (the threshold temperature), the first parameter is set to be greater than 1, and in this case, the first parameter may be increased by intervals of 0.5 every 10 degrees Celsius. When the coolant temperature is below minus 20 degrees Celsius (the threshold temperature) at the starting, the first parameter is set to be greater than 1, and in this case, the first parameter may increase by intervals of 1 every 10 degrees Celsius.

TABLE 1

| Coolant temperature | −30 | −20 | −10 | 0 | 30 | 40 |
|---|---|---|---|---|---|---|
| First parameter | 1.30 | 1.20 | 1.15 | 1.10 | 1 | 1 |

In the cold start state of the vehicle, the fuel injection amount of the engine increases and the oil dilution increases. Therefore, it is determined whether the vehicle is or is not in the cold start based on the coolant temperature, the first parameter is set larger as the coolant temperature is lower, and the increasing in the oil dilution may be predicted. In an embodiment of the present disclosure, the cold start state of the vehicle determined based on the coolant temperature has been described as an example, but the right range of the present disclosure is not limited thereto. The cold start state of the vehicle may be determined based on the engine oil temperature or the outside air temperature.

To this end, the oil temperature sensor detects the temperature of the engine oil and transmits it to the control device 20, and the control device 20 may determine the cold start state of the vehicle based on the temperature of the engine oil detected by the oil temperature sensor. Since the method for determining the cold start state of the vehicle based on the engine oil temperature is the same as the method for determining the cold start state based on the coolant temperature described above, a detailed description is omitted.

Alternatively, the outside air temperature sensor may detect the outside air temperature and transmit it to the control device 20, and the control device 20 may determine the cold start state of the vehicle based on the outside air temperature detected by the outside air temperature sensor. Since the method for determining the cold start state of the vehicle based on the outside air temperature is the same as the method for determining the cold start state based on the coolant temperature described above, a detailed description is omitted.

The control device 20 determines whether the vehicle accelerates rapidly (S30). At this time, whether the vehicle accelerates rapidly may be determined based on the time duration for which the coolant temperature reaches a predetermined standard temperature (e.g., 60 degrees Celsius) (hereinafter, such a time duration is defined as 'an acceleration time'). For example, the vehicle is determined to be in a 'rapid acceleration state' when the acceleration time is less than a reference acceleration time.

If the vehicle is determined to in the rapid acceleration state, the control device 20 sets the second parameter to a value larger than a reference value (e.g., '1') (S31). At this time, the second parameter increases as the acceleration time becomes less than the reference acceleration time and the difference therebetween increases, and decreases as the acceleration time is greater than the reference acceleration time and the difference therebetween increases.

If the acceleration time of the vehicle is the reference acceleration time, the second parameter may be set as the reference value (e.g., '1') (S33). If the acceleration time of the vehicle is less than the reference acceleration time, the second parameter may be larger than the reference value at the first interval. Also, if the acceleration time of the vehicle is greater than the reference acceleration time, the second parameter may be smaller than the reference value by a second interval that is larger than the first interval (S35).

For example, as shown in Table 2 below, if the acceleration time of the vehicle is 100 seconds (the reference acceleration time), the second parameter may be set as 1 (the reference value). If the acceleration time of the vehicle is less than 100 seconds (the reference acceleration time), the second parameter is set to be greater than 1 (the reference value), and in this case, the second parameter may be increased at intervals of 0.2 every 50 seconds. And if the acceleration time of the vehicle is greater than 100 seconds (the reference acceleration time), the second parameter is set to be less than 1 (the reference value), and in this case, the second parameter may be decreased by about intervals of 0.025 every 50 seconds.

TABLE 2

| Time | 50 seconds | 100 seconds | 200 seconds | 300 seconds | 400 seconds |
|---|---|---|---|---|---|
| Second parameter | 1.20 | 1.00 | 0.95 | 0.93 | 0.90 |

In the rapid acceleration state of the vehicle, the fuel injection amount of the engine increases and the oil dilution increases. Therefore, it is determined whether there is the rapid acceleration from the time that the coolant temperature reaches the standard temperature, and by setting the second parameter to be larger as the vehicle is rapidly accelerated, the increasing in the oil dilution may be predicted. In an embodiment of the present invention, the rapid acceleration of the vehicle determined based on the time when the coolant temperature reaches the standard temperature has been described as an example, but the right range of the present disclosure is not limited thereto. The rapid acceleration of the vehicle may be determined based on the vehicle speed detected by the vehicle speed sensor.

To this end, the vehicle speed sensor detects the traveling speed of the vehicle and transmits it to the control device 20, and the control device 20 may determine whether there is the rapid acceleration of the vehicle based on the time when the vehicle traveling speed detected by the vehicle speed sensor reaches the reference speed. Since the method for determining whether the vehicle is undergoing the rapid acceleration based on the vehicle speed is the same as the method for determining whether the rapid acceleration occurs based on the time when the coolant temperature reaches the standard temperature, a detailed description is omitted.

The control device 20 determines a high-speed maintenance time of the vehicle (S40). For example, the control device 20 may determine the time duration for which the coolant maintains a predetermined temperature (e.g., 95 degrees Celsius) during a predetermined time (e.g., 100 seconds), and define such a time duration as the high-speed maintenance time, where the vehicle speed is maintained at a certain speed or above.

As the high-speed maintenance time of the vehicle becomes greater than a reference high-speed maintenance time, the control device 20 sets the third parameter to be smaller than the reference value (e.g., '1') (S41). In this case, the third parameter decreases as the high-speed maintenance time becomes greater than the reference high-speed maintenance time and the difference therebetween increases, and increases as the high-speed maintenance time becomes less than the reference high-speed maintenance time and the difference therebetween increases.

If the high-speed maintenance time of the vehicle is the reference high-speed maintenance time, the third parameter may be set as the reference value (S43). If the high-speed maintenance time of the vehicle is greater than the reference high-speed maintenance time, the third parameter may be smaller than the reference value as the first interval (S41). And if the high-speed maintenance time of the vehicle is less than the reference high-speed maintenance time, the third parameter may be larger than the reference value at the second interval that is larger than the first interval (S45).

For example, as shown in Table 3 below, if the high-speed maintenance time of the vehicle is 100 seconds (a reference high-speed maintenance time), the third parameter may be set to 1 (a reference value). If the high-speed maintenance time of the vehicle is greater than 100 seconds, the third parameter is set to be less than 1 (the reference value), and in this case, the third parameter may be reduced with intervals of 0.05 every 50 seconds. And if the high-speed maintenance time of the vehicle is less than 100 seconds, the third parameter is set to be greater than 1 (the reference value), and in this case, the third parameter may be increased at intervals of 0.1 every 50 seconds.

TABLE 3

| Time | 50 seconds | 100 seconds | 200 seconds | 300 seconds | 400 seconds |
|---|---|---|---|---|---|
| Third parameter | 1.10 | 1.00 | 0.95 | 0.90 | 0.85 |

If the high-speed maintenance time of the vehicle is long, the evaporation rate of the fuel contained in engine oil increases, and the oil dilution decreases. Therefore, by reducing the size of the third parameter as the vehicle's high-speed maintenance time becomes longer and longer, and increasing the size of the third parameter as the high-speed maintenance time becomes shorter and shorter, the increasing or decreasing of the oil dilution can be predicted. In an embodiment of the present In the disclosure, the high-speed maintenance time of the vehicle determined based on the coolant temperature was described as an example, but the right range of the present disclosure is not limited thereto, and the high-speed maintenance time of the vehicle may be determined based on the temperature of the engine oil or the vehicle speed.

To this end, the oil temperature sensor detects the temperature of engine oil and transmits it to the control device 20, and the control device 20 may determine the high-speed maintenance time of the vehicle based on the temperature of the engine oil detected by the oil temperature sensor. Since the method for determining the high-speed maintenance time of the vehicle based on the engine oil temperature is the same as the method for determining the high-speed maintenance time based on the coolant temperature described above, a detailed description is omitted.

Alternatively, the vehicle speed sensor detects the speed of the vehicle and transmits it to the control device 20, and the control device 20 may determine the high-speed maintenance time of the vehicle based on the speed of the vehicle detected by the vehicle speed sensor. Since the method for determining the high-speed maintenance time of the vehicle based on the vehicle speed is the same as the method for determining the high-speed maintenance time of the vehicle based on the coolant temperature described above, a detailed description is omitted.

When the vehicle is turned off (S50), the control device 20 calculates the sum parameter by summing the first parameter or the third parameter (S60). The control device 20 may determine that the larger the size of the summing parameter, the worse the oil dilution.

The control device 20 detects the starting number of the vehicle (S70), and if the starting number is greater than a predetermined number (e.g., 30 times), the control device 20 calculates the average of the summation parameters (S80).

If the average of the summation parameters is higher than the reference average (e.g., 3.4) (S90), the control device 20 determines that there is a problem with the engine oil due to the deterioration of the oil dilution, and informs the driver to check the engine oil or replace the engine oil through the alarming device 30 (S100).

As discussed above, according to the apparatus for alarming of oil dilution and the method thereof according to an embodiment of the present disclosure, the oil dilution may be predicted to be provided to the driver based on the cold start state of the vehicle, the rapid acceleration state of the vehicle, and the high-speed maintenance time of the vehicle.

And the driver may check or replace the engine oil according to the state of the oil dilution, and through this, the risk of the damage to the parts constituting the engine may be prevented in advance.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

10: detecting device
20: control device
30: alarming device

What is claimed is:

1. An apparatus for alarming of oil dilution, comprising:
a control device configured to predict oil dilution based on a cold start state of a vehicle, a rapid acceleration state of the vehicle, and a high-speed maintenance time of the vehicle; and
an alarming device configured to guide the driver to check or replace engine oil based on the oil dilution predicted by the control device.

2. The apparatus for alarming of oil dilution of claim 1, wherein
the control device determines a first parameter based on the cold start state of the vehicle, determines a second parameter based on the rapid acceleration state of the vehicle, determines a third parameter based on the high-speed maintenance time of the vehicle, and predicts the oil dilution based on the first to third parameters.

3. The apparatus for alarming of oil dilution of claim 2, wherein
the control device
sets the first parameter as a reference value when the vehicle is not in the cold start state, and
sets the first parameter to be larger than the reference value when the vehicle is in the cold start state.

4. The apparatus for alarming of oil dilution of claim 3, wherein
when a coolant temperature is higher than a predetermined standard temperature, the control device determines that the vehicle is not in the cold start state and sets the first parameter to the reference value, and
when the coolant temperature is less than the standard temperature, the control device determines that the vehicle is in the cold start state and sets the first parameter to be larger than the reference value.

5. The apparatus for alarming of oil dilution of claim 4, wherein
when the coolant temperature is between the standard temperature and a predetermined threshold temperature, the control device increases the first parameter by a first interval, and
when the coolant temperature is lower than the threshold temperature, the control device increases the first parameter by a second interval that is greater than the first interval.

6. The apparatus for alarming of oil dilution of claim 2, wherein
when the acceleration time for a coolant temperature to reach a predetermined standard temperature is the reference acceleration time, the control device sets the second parameter as a reference value,
when the acceleration time is less than the reference acceleration time, the control device increases the second parameter by a first interval based on the reference value, and
when the acceleration time is greater than the reference acceleration time, the control device decreases the second parameter by a second interval that is greater than the first interval based on the reference value.

7. The apparatus for alarming of oil dilution of claim 2, wherein
when a high-speed maintenance time at which a coolant temperature maintains a predetermined temperature for a predetermined time is a reference high-speed maintenance time, the control device sets the third parameter as a reference value,
when the high-speed maintenance time is greater than the reference high-speed maintenance time, the control device decreases the third parameter by a first interval, and
when the high-speed maintenance time is less than the high-speed maintenance time, the control device increases the third parameter by a second interval that is greater than the first interval.

8. The apparatus for alarming of oil dilution of claim 2, wherein
the control device predicts the oil dilution based on the average of the sum parameter calculated as the sum of the first and third parameters for a predetermined starting number.

9. The apparatus for alarming of oil dilution of claim 8, wherein
the control device guides the check or replacement of the engine oil to the driver through the alarming device when the average of the summing parameter is greater than or equal to the reference average.

10. A method of alarming of oil dilution, comprising:
determining a cold start state of a vehicle;
determining a rapid acceleration state of the vehicle by a control device;
determining a high-speed maintenance time of the vehicle by the control device;
predicting oil dilution based on the cold start state of the vehicle, the rapid acceleration state of the vehicle, and the high-speed maintenance time of the vehicle by the control device; and
guiding checking or replacement of the engine oil to the driver based on the oil dilution by the alarming device.

11. The method of alarming of oil dilution of claim 10, wherein
a first parameter is determined based on the cold start state of the vehicle, a second parameter is determined based on the rapid acceleration state of the vehicle, a third parameter is determined based on the high-speed maintenance time of the vehicle, and the oil dilution is predicted based on the first parameter to the third parameter.

12. The method of alarming of oil dilution of claim 11, wherein
when the vehicle is not in the cold start state, the first parameter is set as a reference value, and
when the vehicle is in the cold start state, the first parameter is set to be larger than the reference value.

13. The method of alarming of oil dilution of claim 12, wherein
when a coolant temperature is higher than a predetermined standard temperature, it is determined that the vehicle is not in the cold start state, so the first parameter is set as the reference value, and
when the coolant temperature is less than the standard temperature, it is determined that the vehicle is in the cold start state, and the first parameter increases to more than the reference value.

14. The method of alarming of oil dilution of claim 11, wherein
when the acceleration time at which a coolant temperature reaches a predetermined standard temperature is the reference acceleration time, the second parameter is set as a reference value,
when the acceleration time is less than the reference acceleration time, the second parameter is increased by a first interval based on the reference value, and when the acceleration time is greater than the reference acceleration time, the second parameter decreases by a second interval that is larger than the first interval based on the reference value.

15. The method of alarming of oil dilution of claim 14, wherein
when the coolant temperature is between the standard temperature and a predetermined threshold temperature, the first parameter is increased by the first interval, and
when the coolant temperature is lower than the threshold temperature, the first parameter is increased by the second interval that is greater than the first interval.

16. The method of alarming of oil dilution of claim 11, wherein
when the acceleration time at which a coolant temperature reaches a predetermined standard temperature is the reference acceleration time, the second parameter is set as a reference value,
when the acceleration time is less than the reference acceleration time, the second parameter is increased by a first interval based on the reference value, and
when the acceleration time is greater than the reference acceleration time, the second parameter is decreased by a second interval that is larger than the first interval based on the reference value.

17. The method of alarming of oil dilution of claim 11, wherein
when a high-speed maintenance time at which a coolant temperature is maintained for a predetermined time is a reference high-speed maintenance time, the third parameter is set as a reference value,
when the high-speed maintenance time is greater than the reference high-speed maintenance time, the third parameter is decreased by a first interval, and
when the high-speed maintenance time is less than the reference high-speed maintenance time, the third parameter is increased by a second interval that is greater than the first interval.

18. The method of alarming of oil dilution of claim 11, wherein
the oil dilution is predicted based on the average of a sum parameter calculated as the summing of the first parameter to the third parameter during a predetermined starting number.

19. The method of alarming of oil dilution of claim 18, wherein
when the average of the sum parameter is greater than or equal to the reference average, the alarming device guides the driver to check or replace the engine oil.

* * * * *